H. Y. ARMSTRONG.
WRAPPING MACHINE.
APPLICATION FILED OCT. 7, 1915.

1,308,320.

Patented July 1, 1919.
8 SHEETS—SHEET 8.

Witnesses
J. H. McCurdy
J. P. Marsh

Inventor
Harry Y. Armstrong
By his attorney
Peter Peter & Bell

UNITED STATES PATENT OFFICE.

HARRY Y. ARMSTRONG, OF SPRINGFIELD, MASSACHUSETTS, ASSIGNOR TO PACKAGE MACHINERY COMPANY, OF SPRINGFIELD, MASSACHUSETTS, A CORPORATION OF MASSACHUSETTS.

WRAPPING-MACHINE.

1,308,320.   Specification of Letters Patent.   Patented July 1, 1919.

Application filed October 7, 1915. Serial No. 54,646.

*To all whom it may concern:*

Be it known that I, HARRY Y. ARMSTRONG, a citizen of the United States, residing at Springfield, in the county of Hampden and State of Massachusetts, have invented certain Improvements in Wrapping-Machines, of which the following description, in connection with the accompanying drawings, is a specification, like reference characters on the drawings indicating like parts in the several figures.

This invention relates to wrapping machines and will be herein disclosed as embodied in a machine designed especially for wrapping plugs of tobacco, although the various features of the invention are in no wise limited to use in this particular, this specific machine being shown merely for purposes of explanation.

In wrapping many products, such for instance as plugs of tobacco, cakes of soap, chocolate, and other material, it is found that there is a very substantial variation in any given commercial size, and that these variations are the cause of much trouble in the wrapping of such products especially where a very tightly wrapped package is required. It is an important object of the present invention to make provision for these variations and to devise a wrapping mechanism which will produce automatically the tight wrapping and neat packages required, although many of the features of the invention also may be used to advantage in wrapping products which do not have the extraordinary variations above mentioned.

It is a common practice in the wrapping of articles of the general character above indicated to affix to each package a band or label which frequently is utilized to hold in place the end folds of the package. Usually this band serves for certain ornamental purposes while in other instances, as in wrapping tobacco, the band usually is in the form of a revenue stamp. In the latter case reliability is an exceedingly important requirement of the mechanism by which the stamps are to be applied because of the expense involved in wasting stamps. In any case it is desirable that the bands be firmly secured and neatly affixed to the packages. The present invention provides a banding mechanism designed to meet these requirements and in the specific form shown this mechanism is designed to affix to each package both a revenue stamp and a band or label which may bear an attractive design or advertising matter.

The invention also is directed to other features including novel means for folding the bands or labels about the package; provision for maintaining the bands in proper alinement during their application to the package and for registering the ends of the bands accurately; and mechanism designed to perform the various operations on the package without tearing, abrading or wrinkling the wrapper or bands.

In the accompanying drawings,

Fig. 7 is a vertical, sectional view in the plane of the path which the package takes in traveling through the banding mechanism;

Fig. 7$^a$ is a fragmentary view showing certain details of the banding mechanism;

Fig. 7$^b$ is a view on the line $b-b$ Fig. 7;

The general function of the machine shown is to wrap plugs of tobacco one at a time in sheet wrapping material of some convenient character, such for instance as tin foil, a coupon being inclosed in the wrapper with the tobacco, and then to fold about the package so produced two bands one of which may consist of a revenue stamp and the other of a label bearing advertising matter. These bands preferably are folded over the end folds of the wrapper and secure them in their folded positions.

The machine shown comprises a machine frame 2 having bearings in which a main shaft 4 is rotatably mounted and this shaft carries a hand wheel 5 by which the machine may be operated manually, a loose pulley 6 enabling the machine to be belted to any convenient source of power, and a clutch by which a driving connection between the pulley 6 and the shaft 4 may be effected. A cross shaft 8 is driven through a bevel gear connection with the main shaft 4.

The plugs of tobacco to be wrapped are carried into the machine on a conveyer belt 10 supported on suitable pulleys one of which is indicated at 11, this pulley being driven through connections with the cross shaft 8. This belt travels over a long table 12 having two guides 13 which lie at opposite sides of the belt 10 and serve to guide the plugs against lateral displacement. An arm 14 overlies the belt 10 and serves to stop the procession of plugs and position the endmost plug for the operation of a plunger 15 which carries the plugs one at a time into the wrapping mechanism. Since all the plugs merely rest on the belt under their own weight, the belt will slip freely under them when their motion is arrested by the stop 14.

Figure 3:
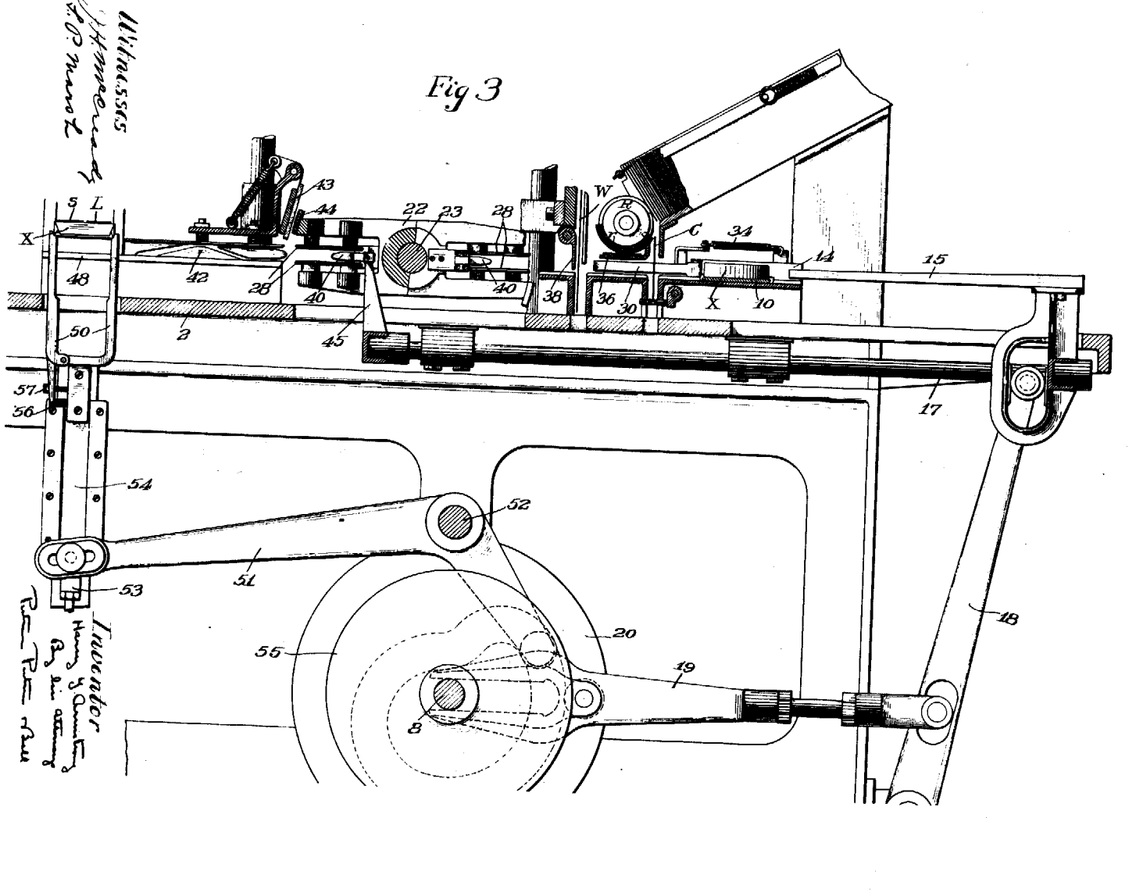
Fig. 3 is a vertical, sectional view through the machine shown in Fig. 1, the plane of cut being substantially in the path of travel of a package through the wrapping mechanism.

The plunger 15 is mounted on a cross head carried by two rods 17 which slide in horizontal guides secured to the frame 2 of the machine and this cross head is slotted to receive a roll mounted on the upper end of a lever 18 which is oscillated by means of a cam follower 19 driven by a cam 20 fast on the shaft 8. The movement thus imparted to the plunger 10 is sufficient to cause it to carry a plug positioned as indicated at X, in Fig. 3, from a point on the belt 10 and against the stop 14, into a tumble box 22 which is mounted on a rotatable shaft 23 having a geared connection with a Geneva movement 24 (see Fig. 1) that is driven from the shaft 8 and imparts to the tumble box a series of rotative movements of 180 degrees each. This tumble box has two diametrically opposed pockets each adapted to receive a plug of tobacco with a wrapper partially folded about it. Two spring pressed plates 28 form respectively the upper and lower sides of each pocket and yield to accommodate packages varying in thickness. Fig. 3 shows the tumble box in its stationary position ready to receive the plug X which is shown in position to be moved into the tumble box by the plunger 15.

As above indicated, these plugs of tobacco vary substantially in length and in order to take care of this variation a centering mechanism is provided between the belt 10 and the tumble box 22 to center the plugs with reference to the tumble box before they are moved into the tumble box by the plunger 15. As each plug X is advanced by the plunger or feeder 15 it is carried over a stationary support which is secured to the machine frame. The centering mechanism comprises two arms 30 and 31 (see Fig. 4) which lie substantially parallel to each other and on opposite sides of the path of movement of the plug as it is carried over said support. These arms are pivoted at 32 and 33, respectively, so that their forward ends are free to move toward and from each other and each arm has secured rigidly to it an inwardly projecting shank the ends of which shanks overlie each other and are connected together by a pivot pin to which one end of spring 34 is connected. As clearly shown in Fig. 4, this spring tends to swing the forward ends of the two arms 30 and 31 toward each other and consequently causes them to center a plug of tobacco as it is forced between them, the spring 34 yielding of course to accommodate plugs of different lengths.

Figure 13:
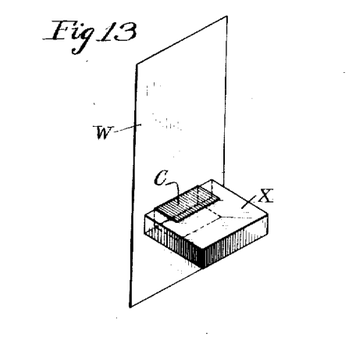
Figs. 13 to 19, inclusive, are perspective views showing successive steps in the process of wrapping and banding an article.

While the plug is passing through the centering mechanism it picks up the coupon C which has been positioned across the path of movement of the plug by means of a coupon feeding mechanism which may be of any convenient character but in the form shown in Fig. 3 is substantially like that shown in Patent No. 1,061,584, granted May 13, 1913. The location of the coupon feeding mechanism in the manner described provides a very compact arrangement. It is sometimes desirable to inclose two coupons in each package and this result may be conveniently accomplished by lengthening the friction segment $r$ on the stripper roller R (see Fig. 3) so that when this segment has advanced one coupon, it will immediately feed the next succeeding coupon into the path of the package X. The package X strikes substantially the middle of the coupon and then passes under a plate 36 which coöperates with the support over which the plug moves to fold the coupon over the forward edge of the plug as shown in Fig. 13. In this condition the plug next comes in contact with its wrapper which is standing across the path of movement of the plug, as indicated at W in Fig. 3, and the further movement of the plug into the pocket of the tumble box carries it under a horizontal plate 38 which serves to fold the wrapper over the top of the plug. Any suitable form of wrapper feeding mechanism may be employed. The wrapper usually required for wrapping plug tobacco consists of a metal foil lined with paraffined paper and it is fed to the machine in the form of a continuous strip, the length required for a wrapper being advanced and cut off the strip at each cycle of operation of the machine. The feeding and cutting mechanism shown in Patent No. 998,736, granted July 25, 1911, may conveniently be employed to feed and cut the wrappers.

Figure 14:
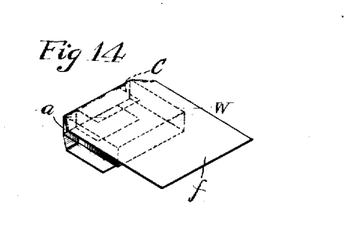

When the plug X is finally deposited in one of the pockets of the tumble box 22, the wrapper is folded over the forward edge and the top and bottom faces of the plug, as shown in Fig. 14. The first end folds or tucks in the wrapper are made also at this time (one of these folds being indicated at $a$, Fig. 14) by means of two end tuckers 40 best shown in Figs. 3 and 5, which are supported by springs secured, respectively, to the opposite ends of the hub of the tumble box.

Figure 15:
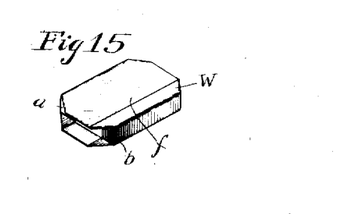
Figure 16:
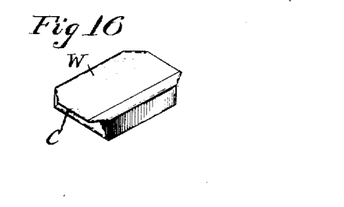

As soon as the package is deposited in the pocket, the tumble box is given a half rotation in a counter clockwise direction as seen in Fig. 3, thus carrying the pocket in which the article has just been placed into line with a folding chute 42. During this movement the flap $f$ (see Fig. 14) which is trailing behind, is caught and pinched gently between a yielding presser member 43 and a part 44 carried by the tumble box. The package is now ejected from the tumble box into the folding chute 42 and this movement folds the flap $f$ over into the position in which it appears in Fig. 15, thus completing the wrapping of the longitudinal faces of the plug and leaving only the end folds to be made to complete the wrapping operation.

The ejecting movement of the plug is effected by means of an ejecting plunger 45 mounted on the forward end of the rods 17 which form the guides for the feeding plunger 15. It will be evident from an inspection of Fig. 3 that the pockets in the tumble box have no bottoms but that a space is provided between each pocket and the hub of the tumble box. The ejector 45 normally rests in this space and directly behind the forward pocket, as shown in Fig. 3. Accordingly, when the plunger 15 moves forward to carry the next package into the tumble box, the ejector 45 is simultaneously moved forward to carry the package in the left hand pocket as the parts are seen in Fig. 3, out of this pocket and entirely through the folding chute 42 to the banding mechanism. Soon after the ejector 45 has cleared the forward end of the tumble box in making its ejecting movement, the tumble box begins to rotate and the part 45 completes its ejecting movement and returns to its normal position again after the left hand pocket has swung away from the position in which it is shown in Fig. 3 and while the next pocket is arriving in this position. The skeleton form of tumble box permits this movement of the ejector together with the fact that the tumble box is mounted to swing between the guides 17.

Figure 1:
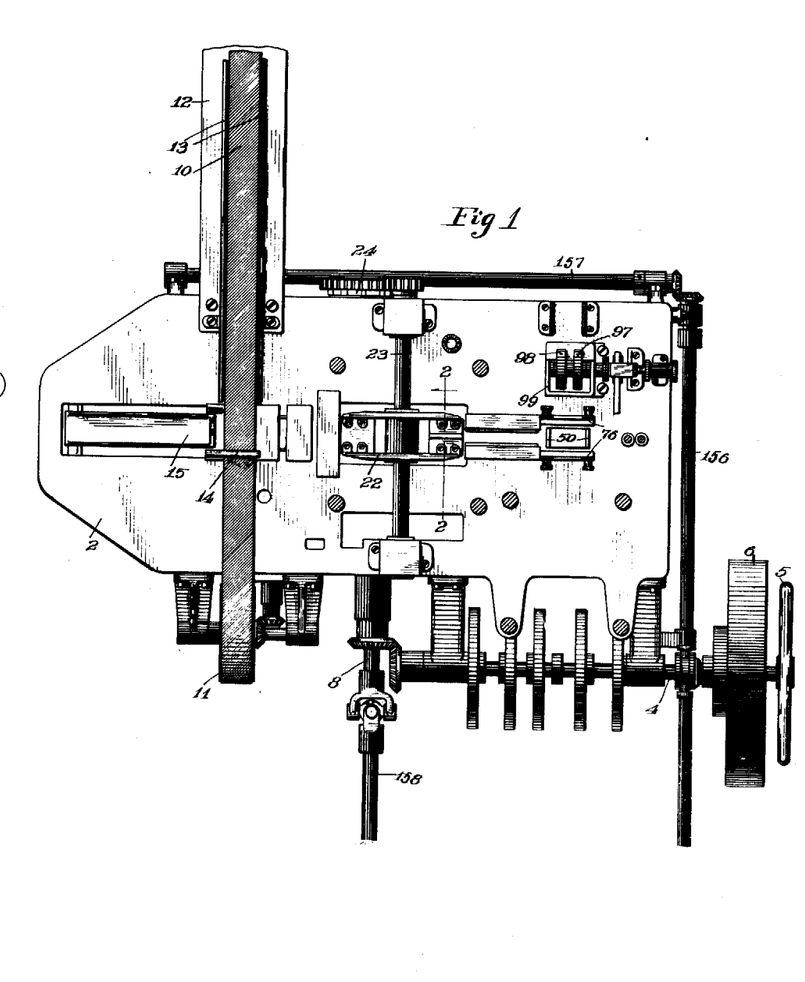
Figure 1 is a plan view of the frame and part below the plane of the frame top of a machine embodying this invention.
Figure 2:
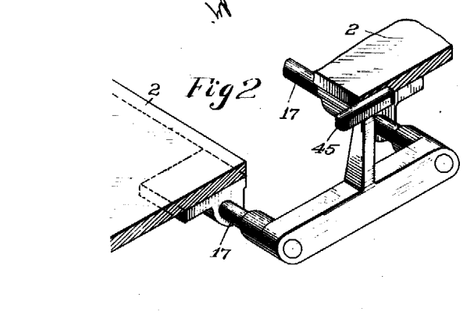
Fig. 2 is a perspective view of a detail of construction.
Figures 4, 5, 6:
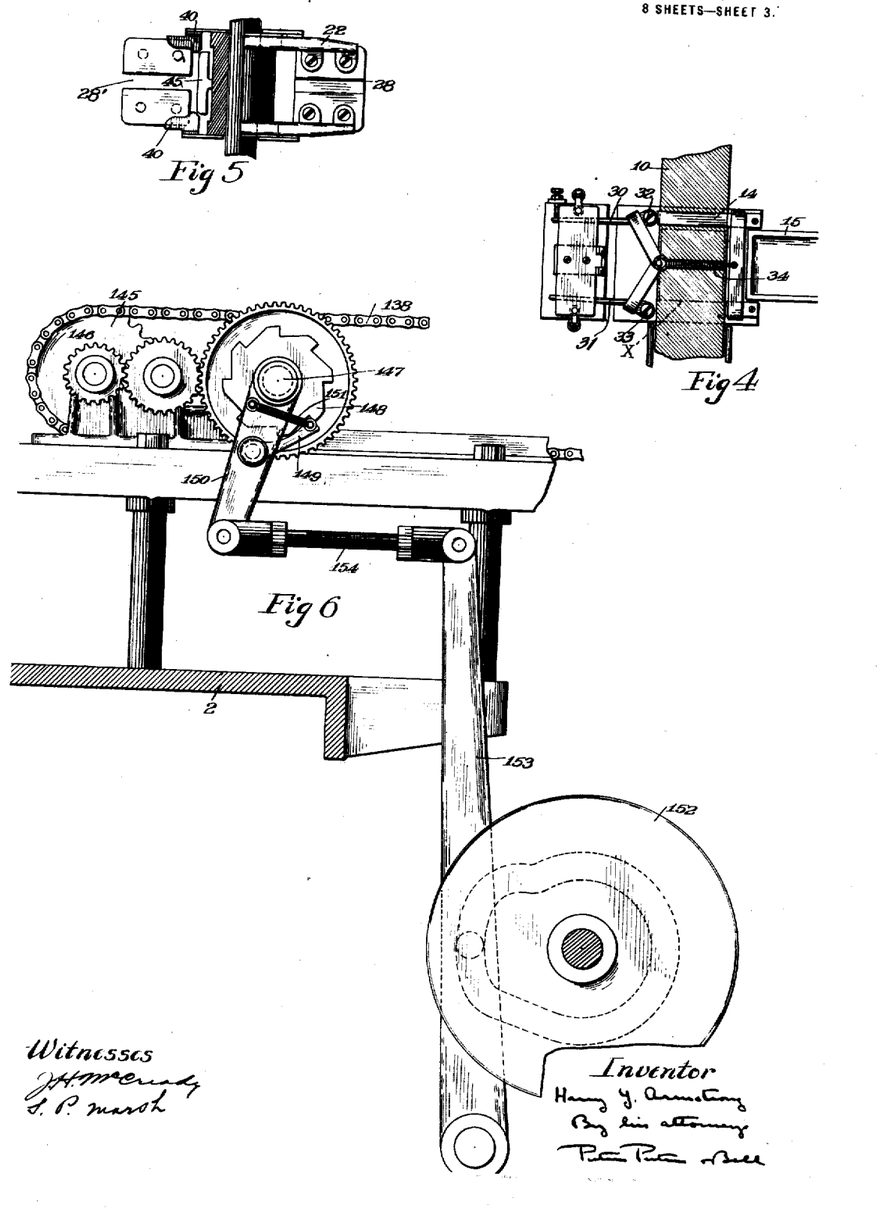
Fig. 4 is a plan view of the article centering mechanism.
Fig. 5 is a plan view partly in section of the tumble box.
Fig. 6 is a side elevation partly in section of certain parts of the driving mechanism.

The end tuckers 40 above mentioned are held inwardly toward each other by their spring supports but are enabled by these supports to be moved away from each other upon the entrance between their forward beveled ends of a plug longer than a certain minimum. In the event that a very long plug enters the tumble box there is danger that the tuckers will be pressed so firmly against the package as to wrinkle up the wrapper when the ejector 45 pushes the plug out from between the tuckers. In order to prevent this difficulty the ends of the ejector head are curved or beveled to engage corresponding beveled portions of the tuckers 40, as will be clearly understood from an inspection of Fig. 5, so that the ejector will spread the tuckers 40 apart far enough to relieve their pressure on the tucked portion $a$ of the wrapper and preferably move them entirely out of contact with the ends of the package before the ejector strikes the package and causes any sliding movement of the package relatively to the tuckers. This construction thus avoids any possibility of the wrapper becoming wrinkled through the action of the tuckers 40. As indicated in Figs. 1, 3 and 5, one of the plates 28 of each pocket of the tumble box is slotted, as indicated at 28', Fig. 5, to permit the passage therethrough of the shank of the ejector head.

Figure 17:
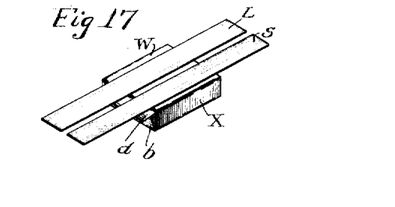

The folding chute 42 may be of any suitable form designed to accommodate packages varying considerably in length, a very convenient form being shown in my co-pending application filed Sept. 27, 1915, Ser. No. 52,868. This chute is operative to make all the other end folds $b$, $c$ and $d$ necessary to complete the end wrapping operation, leaving the package completely wrapped in tin foil or other wrapping material, the coupon C being inclosed in the package. Fig. 17 shows the package in its complete form.

Figures 7, 7A, 7B:
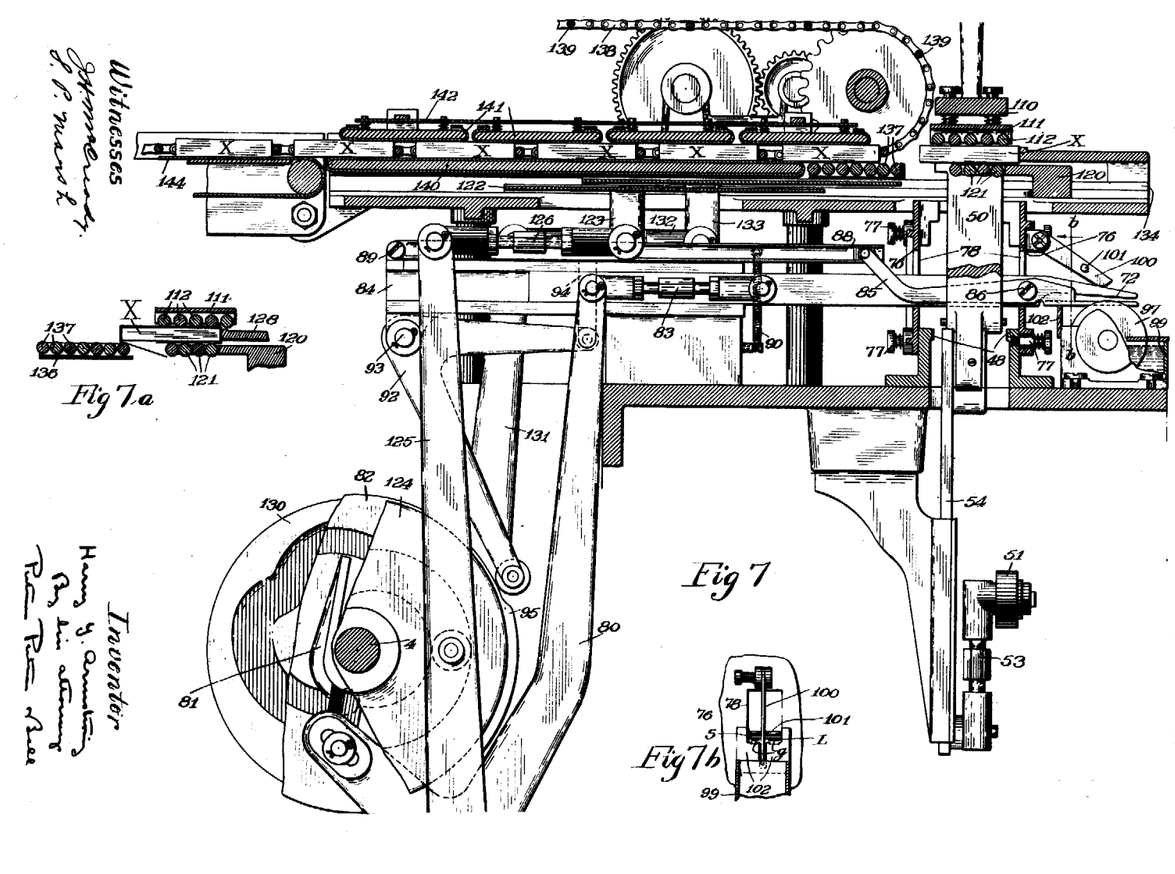
Figure 11:
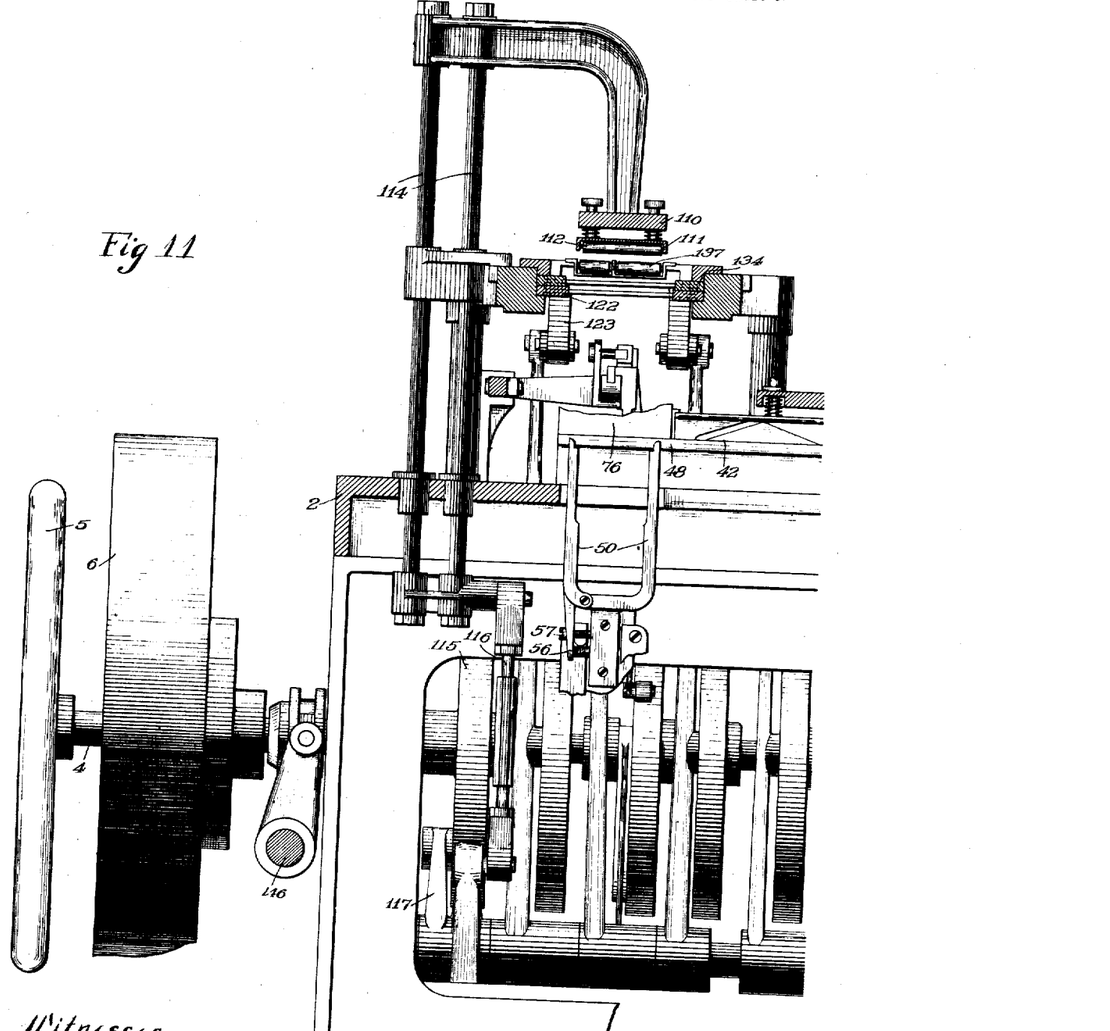
Fig. 11 is a vertical, sectional view through the banding mechanism at right angles to the view shown in Fig. 7.

The wrapped packages are moved by the ejector 45 past the end of the folding chute on to two projecting ledges 48 that form continuations of the bottom of the folding chute into a position directly over a U-shaped plunger or elevator 50, the ledges serving to support the package by its ends in this position. The plunger is mounted for vertical reciprocating movement and carries the packages one at a time to the devices that fold the bands about the package. The operating mechanism for this plunger is best shown in Figs. 3 and 7 and comprises a lever 51 fulcrumed on the machine frame at 52 and having one arm connected by an adjustable link 53 with the shank 54 of the plunger which moves in vertical guideways, the other arm of said lever being provided with a roll which runs in a cam path formed in a cam 55 mounted fast on the cross shaft 8. As clearly shown in Figs. 3 and 11, the left hand arm of the plunger 50 is pivoted to the other arm and is provided with a downwardly projecting extension which is acted upon by a spring 56 in a direction tending to swing the upper end of the arm toward its companion, this movement, however, being limited by a screw 57 that projects through the movable arm and is threaded into the shank 54. This arrangement is provided to enable the plunger or elevator to handle packages varying in width. It will be evident from an inspection of Fig. 3 that the package is supported by the upper ends of the two elevator arms which for this purpose are notched or shouldered to provide vertical beveled faces that engage the sides of the package and horizontal faces that engage the bottom of the package near its opposite sides. Since the ejector 45 has a stroke of definite length it will move the rearward side of each package to a fixed point on each ejecting stroke. This stroke is so proportioned that the point just mentioned will be in line with the vertical package engaging face of the right hand arm of the plunger 50 as the parts are seen in Fig. 3. Any variation in width of the package, therefore, will be accommodated by the yielding movement of the pivoted left hand arm, this movement being produced by the contact of the beveled end of the arm with the side of the package when the elevator is raised.

Figure 8:
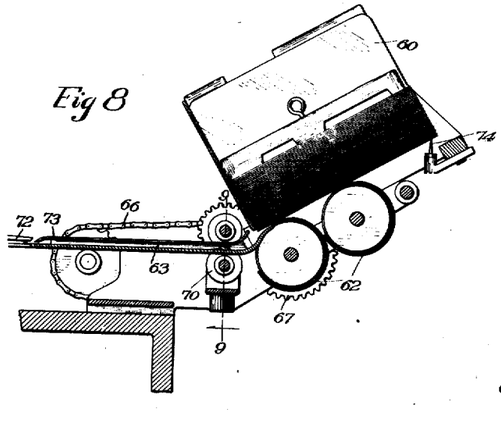
Fig. 8 is a vertical, sectional view through the band feeding mechanism.
Figure 9:
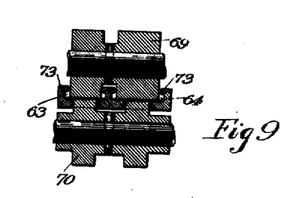
Fig. 9 is a sectional view on the line 9—9, Fig. 8.
Figure 12:
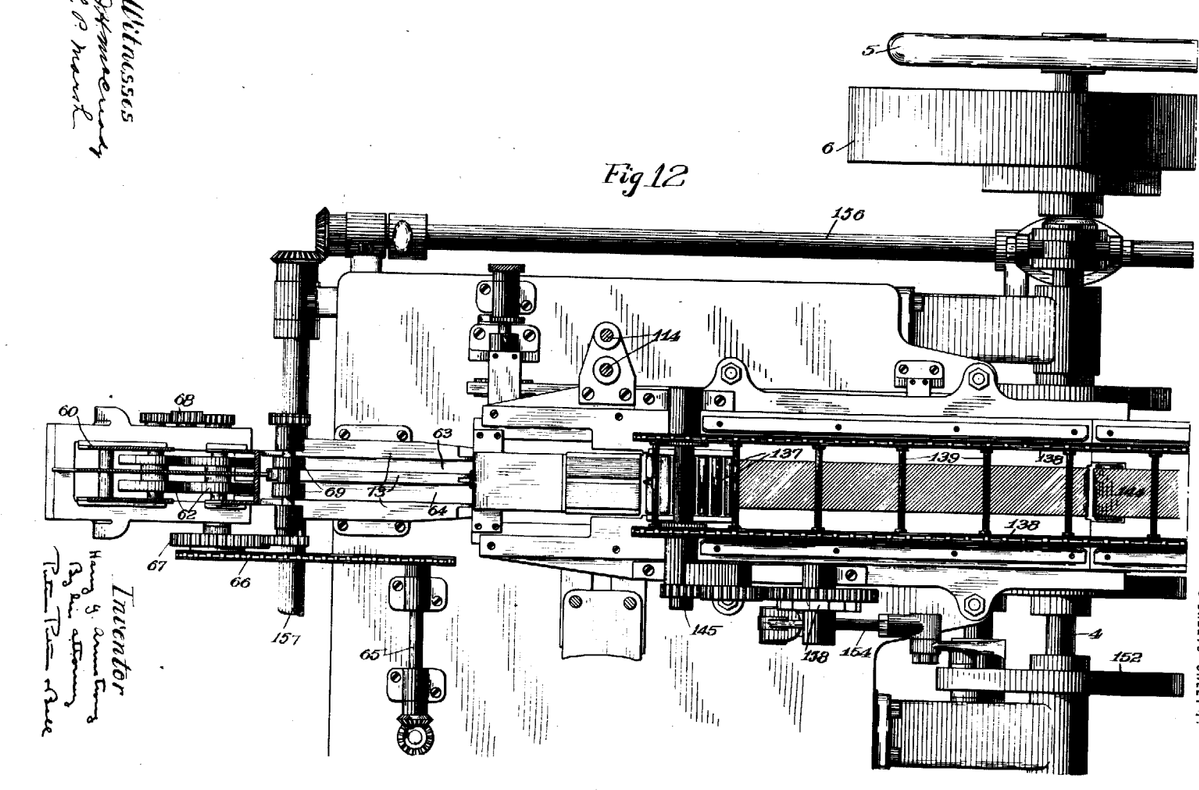
Fig. 12 is a plan view partly in section showing parts of the banding mechanism.

While the package is supported on the two ledges 48 and just prior to the upward movement of the elevator 50 into engagement with the package, a band delivering mechanism operates to position two bands on the package in substantially the positions in which they are indicated at L and S, respectively, in Figs. 3 and 17. This band delivering mechanism comprises a double magazine 60 (see Figs. 8 and 12) designed to receive the stacks of labels and stamps, respectively, the stamps being separated from the labels by a central partition. Two sets of stripper rolls 62, one set in advance of the other and both underlying the two stacks of bands, operate on the bottommost label and stamp to feed them forward simultaneously into parallel guideways 63 and 64, respectively, which open in front of and at the bottom of the magazine. A pair of needles 74 project, respectively, into the two compartments of the magazine and prevent the stripper rolls from advancing more than one stamp and one label at a time. The forward set of stripper rolls 62 are operated by driving connections with the cross shaft 8, these connections including a shaft 65, a chain 66, and a gear 67 and the two sets of rolls are geared together by a train of gears 68 (see Fig. 12) so that they rotate together. Just as the bottommost label and stamp are advanced into their guideways 63 and 64, they are fed between two pairs of upper and lower rolls 69 and 70, respectively, (see Figs. 8 and 9) which are geared to each other and are driven by the gear 67. These rolls operate on the entire lengths of the two bands, that is the stamp and label, to feed them forward in the guideways 63 and 64 and they are so positioned with reference to the length of the two bands that they advance them until the forward ends of both bands lie at the forward ends of the guideways where they are positioned for the engagement of a nipper 72 which completes the band feeding operation. Narrow guides 73 overlie the bands as they travel through their guideways 63 and 64 and prevent them from becoming displaced. The forward ends of these guides 73 are turned downwardly to insure the accurate positioning of the ends of the bands.

When a package is pushed through the folding chute 42 by the ejector 45 and positioned over the elevator 50, it is forced between a pair of vertical plates 76 which lie at opposite sides of the path of the package and are positioned to bear against the ends of the package and hold the end folds in place. These plates are supported loosely on pins 77 which are encircled by springs that force the plates against the opposite ends of the package but permit them to yield outwardly when a package is forced between them. Both of these plates are apertured, as indicated at 78, Fig. 7, to permit the passage horizontally therethrough of the nipper 72. This nipper is reciprocated by means of a bell crank lever 80 to one arm of which a cam follower 81 operated by a cam 82 fast on the shaft 4 is connected, and the other arm of which is connected by an adjustable link 83 to the nipper bar, this bar being mounted to slide in a horizontal way 84 formed in a stationary part of the machine frame. The forward end of this nipper bar is shaped to form the stationary jaw of the nipper. The movable jaw 85 is pivoted to the nipper bar at 86 and its rearmost end is pivoted to a block which slides in a channel bar 88 pivoted at 89 and normally held downwardly by a spring 90. This spring thus acts to hold the nipper in its closed condition. A bell crank lever 92 pivoted on the machine frame at 93 and connected to the channel bar 88 by a link 94, carries a roll running on a surface cam 95 mounted fast on the shaft 4, which serves to open the nipper at the proper points in its travel and allows the spring 90 to close the nipper at other points in its stroke.

Figure 10:
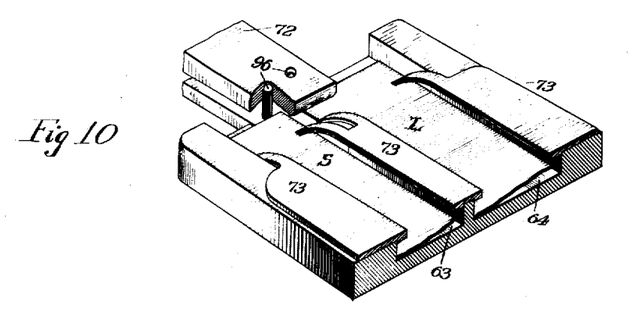
Fig. 10 is a fragmentary, perspective view showing certain details of the band feeding mechanism.

The mechanism just described operates to advance the nipper 72 through the aperture 78 and over the elevator 50 to the forward ends of the band guideways 63 and 64, as shown in Fig. 10. At this time the cam 95 operates through the connections just described to close the nipper on the two ends of the bands S and L, as shown in Fig. 10, after which the nipper immediately starts on its return stroke, thus drawing these two bands out of their guideways and carrying them over the package which at this time is resting on the two ledges 48 just above the elevator 50. As shown in Fig. 10, the nipper 72 carries two pins 96 which limit the entrance of the ends of the bands between the nipper jaws and facilitate the accurate positioning of the bands on the package.

While the two bands S and L are being advanced to position them on the package they are moved over two glue applying rolls 97 and 98, respectively (see Figs. 1 and 7) which rotate in a reservoir 99 of glue or other adhesive and which apply a strip of glue to the entire length of both the label and stamp. These glue rolls may be driven in any convenient manner but preferably are operated in the manner that the glue rolls are operated in the machine shown in my copending application S. N. 833,157, filed Apr. 20, 1914, for improvements in wrapping machines. It therefore is deemed inadvisable to show the details of this mechanism in the present application.

In order to properly aline the bands on the package or in other words to keep them in their parallel and spaced relationship, an arm 100 is pivoted to one of the plates 76 directly over the path of travel of the nipper 72, as shown in Fig. 7, and is of such length that, as the nipper is withdrawn carrying a pair of bands with it over the glue applying rolls 97 and 98, the arm 100 will drop between the bands and thus keep them properly spaced. This arm, of course, because of its pivotal movement, is moved out of the path of the nipper 72 when the nipper strikes it on the forward stroke of the nipper. These parts are shown in Fig. 7ᵇ in the positions which they would occupy just after the nipper 72 has moved through the opening 78 in the first plate 76, the arm 100 having dropped into substantially a vertical position between the bands L and S. The forward ends of the bands at this time lie between the two plates 76 and they are held in alinement by the opposite sides of the aperture 78 and by the arm 100. The bands are supported at this time by the lower edge of the forward aperture 78 and by horizontal shoulders formed in a plate 102 (see Figs. 7 and 7ᵇ) which is secured to the rear wall of the glue tank 99. These shoulders are notched or cut away at points immediately under the strips of glue $g$ on the bands but support each band at opposite sides of said strip. In Fig. 7ᵇ the bands S and L are shown slightly above these shoulders for the purpose of clearness. A pin 101, projecting horizontally through the arm 100 lies at this time immediately over the bands S and L and prevents any tendency of the bands to twist or get out of their proper positions. These bands thus are caused to move in a definite or predetermined path and are held accurately in proper positions for their application to the package, thus insuring their correct placement on the package and the exact registry of the ends of the bands with reference to each other in the subsequent folding operations.

The nipper continues its backward movement until it has delivered the two bands in the proper position on the package lying between the plates 76 at which time the cam 95 operates the movable jaw 85 of the nipper to cause it to release the bands. Fig. 17 shows substantially the position of the bands on the package at this time. During the latter part of the movement of the nipper, a presser head 110, carrying a yieldingly supported presser plate 111 in which a horizontal series of rolls 112 are mounted, descends between the plates 76 on to the top of the package which is supported over the elevator 50. This presser member is mounted on the upper ends of a pair of guide rods 114 (see Fig. 11) which slide in vertical guideways formed in the machine frame, and is operated by a cam 115 through connections including a link 116 and a lever 117. The series of rolls 112 which form the package engaging portion of this member are brought down on top of the bands L and S as soon as they are positioned on the package by the nipper 72 and just prior to the opening movement of the nipper so that they clamp the two bands in their proper positions on the package before or at substantially the same time that the bands are released by the nipper. The U-shaped elevator 50 immediately begins its upward movement, the yielding arm of this elevator finding its proper position on the side of the package in the manner above described, and the elevator and presser member then rise simultaneously to the position in which they are shown in Fig. 7, carrying the package with them. The upward movement of the package brings the projecting portions of the bands against the upper edges of the apertures 78 in the two plates 76 and folds these projecting portions over the folds of the wrapper at the opposite ends of the package.

Figure 18:
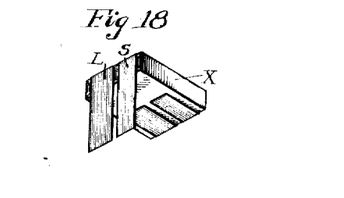

As soon as the package has arrived in the position in which it is shown in Fig. 7, a bottom folder 120 advances under the package into the space between the arms of the elevator 50. This folder carries a series of rolls 121 which form its package engaging face and operate on the rear depending flaps of the two bands to fold them against the bottom of the package, leaving the package in the condition in which it is shown in Fig. 18. This folder is mounted fast on a horizontal slide 122, Fig. 7, from which an arm 123 depends, and it is operated by a cam 124 on the shaft 4 which rocks a lever 125, the upper end of this lever being connected by an adjustable link 126 to the member 123. As soon as this folder has moved into the position in which it is shown in Fig. 7, a plunger 128, formed on a slide 134 lying parallel to and just above the slide 122, engages the rear face of the package and starts the package ahead, the folder 120 moving in unison with the plunger 128. Inasmuch as the package is now supported on the folder 120, the elevator 50 is now free to descend in readiness to receive another package. The U-shaped form of the elevator also permits the nipper 72 to advance while the elevator is in its uppermost position through the space between the elevator arms in readiness to deliver another pair of bands.

Figure 19:
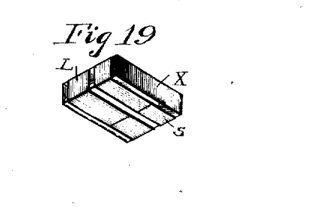

A cam 130 on the shaft 4 operates a lever 131 which is connected by means of a link 132 to a lug 133 projecting from the bottom of the slide 134 on which the plunger 128 is mounted and gives this plunger its operative movement. The members 120 and 128 continue their forward movement in unison until the parts have reached substantially the positions in which they are shown in Fig. 7ª at which time the folder 120 stops while the plunger 128 continues to move forward, thus pushing the package on to a series of rolls 137 mounted on a stationary plate 136 and forming a stationary folder. These rolls 137 fold the forward depending ends of the bands against the bottom of the package and over the ends of the bands that have already been folded by the rolls 121, leaving the package in the condition in which it is shown in Fig. 19. Preferably the two bands are glued throughout their entire length so that they will be firmly secured to the package and their ends will be secured to each other.

The package is advanced far enough by the plunger 128 so that one of a series of bars 139, carried by a pair of chains 138 which lie on opposite sides of the path of movement of the packages, engages the rear face of the package as soon as the plunger 128 withdraws and continues the advancing movement of the package. The parts 126 and 120, of course, immediately withdraw to their initial positions in readiness to operate on the next succeeding package. It will be readily understood that, by making the package engaging portions of the presser member 110 and the folder 120 in the form of a series of rolls, as above described, the movement of the package relatively to these parts cannot wrinkle up the wrapper or the bands since the rolls will travel with the parts of the package on which they bear.

The chains 138 operate through the bars 139 to force the packages over a supporting plate 140 and under a series of yieldingly mounted presser plates 141 carried by a removable plate 142. The plate 140 preferably is covered with a strip of canvas or some similar material which loosely encircles the member 140 so that it can slip on this member under the drag of the packages while at the same time coöperating with the presser plates 141 to hold the bands firmly in their folded positions while the glue is drying. After the packages pass out from under the presser plates 141 they are carried by the chains 138 on to a conveyer belt 144 which is supported on rotatable pulleys. Preferably the chains 138 are given a step by stem movement. For this purpose they are driven by a sprocket wheel 145 fast on a shaft 146 which is driven through a train of gears, as shown in Fig. 6, from a shaft 147 that carries a ratchet wheel 148 which is intermittently rotated by means of a pawl 149 carried by a lever 150 and yieldingly held in contact with the wheel 148 by a spring 151. The arm 150 is oscillated by a cam 152 fast on the shaft 4 which rocks a lever 153 that is connected to the arm 150 by an adjustable link 154.

The machine herein shown is designed to be used in conjunction with another machine which performs an additional operation on the packages and the conveying mechanism above described is advantageous in delivering the packages in timed relationship to the operations of the second machine. The shaft 148, which is driven by a universal joint on the cross shaft 8, is intended to drive this second machine and the shipper shaft 156 which controls the clutch preferably is extended to the other machine so that both machines are under a common control, the shaft 157 geared to the shaft 158 being merely provided for the purpose of securing thereto a controlling lever in convenient position for an attendant to operate it.

The banding mechanism *per se* is not claimed in this application but is claimed in divisional application Serial No. 235,168 filed May 17, 1918.

Having thus described my invention, what I claim as new and desire to secure by Letters Patent of the United States is:

1. In a wrapping machine, the combination with a tumble box having a pocket for the reception of a package with a wrapper partially folded about it, of two tuckers positioned, respectively, at opposite sides of said pocket, said tuckers being arranged to bear against the ends of the package to make end tucks in the wrapper as the package is forced into the pocket but being supported for movement away from the ends of the package, and means operative after the tuckers have made their tucks in the wrapper to relieve the pressure of said tuckers against the ends of said package.

2. In a wrapping machine, the combination with a tumble box having a pocket for the reception of a package with a wrapper partially folded about it, of two tuckers positioned, respectively, at opposite sides of said pocket, said tuckers being arranged to bear against the ends of the package to make end tucks in the wrapper as the package is forced into the pocket but being supported for movement away from the ends of the package, a plunger arranged to move the package out of said pocket and operative to relieve the pressure of said tuckers against the ends of said package before any relative sliding movement of the package and tuckers is effected, and means for operating said plunger.

3. In a wrapping machine, the combination with a tumble box having a pocket for the reception of a package with a wrapper partially folded about it, of two tuckers positioned, respectively, at opposite sides of said pocket, said tuckers being arranged to bear against the ends of the package to make end tucks in the wrapper as the package is forced into the pocket but being yieldingly supported so that they may be moved away from the ends of the package, a plunger movable to force the package out of said pocket, said plunger being arranged to engage the tuckers and force them away from the ends of the package before it effects an ejecting movement of the package, and means for operating said plunger.

4. In a wrapping machine, the combination of a tumble box having diametrically opposed pockets and a space behind each pocket, each of said pockets being constructed to receive a package with a wrapper partially folded about it, a folding chute mounted adjacent to said tumble box, a plunger mounted independently of said tumble box and operative to eject the packages successively from the pockets of the tumble box and force them one at a time through said chute, a second plunger operative to introduce a package with its wrapper into a pocket of the tumble box while the first plunger is making its ejecting movement, common supporting and operating means for said plungers, and operating mechanism for said tumble box, said operating mechanisms being timed to cause the tumble box to turn as soon as the first plunger has ejected a package and to cause the ejecting plunger to be moved back into the space behind one of the pockets while the tumble box is being rotated to bring the next pocket into alinement with the folding chute.

5. In a machine of the character described, the combination of wrapping mechanism, a feeder operative to carry articles to be wrapped one at a time into said wrapping mechanism, wrapper feeding means operative to introduce a wrapper into the path of each of said articles as it is carried into said wrapping mechanism, centering means operative on each article before it engages its wrapper and while it is being advanced by said feeder to center it with respect to the wrapping mechanism, and a coupon feeding mechanism operative to introduce a coupon into the path of each article in such a position that the article will pick up the coupon while the article is passing through the centering mechanism.

6. In a machine of the character described, the combination with mechanism for wrapping articles one at a time including means for folding the wrapper at the opposite ends of each article, of banding mechanism to which the wrapped articles are delivered one at a time by said wrapping mechanism, said banding mechanism being operative to affix two parallel bands side by side around each package and over the ends at which said end folds are made whereby said bands will hold said folds in their folded positions.

7. In a machine of the character described, the combination with wrapping mechanism including a folding chute and means for advancing packages one at a time through said chute, of banding mechanism including an elevator to which the wrapped packages are delivered one at a time by said advancing means.

8. In a machine of the character described, the combination with wrapping mechanism including a folding chute and means for advancing packages one at a time through said chute, of banding mechanism including an elevator to which the wrapped packages are delivered one at a time by said advancing means, said folding chute having extensions projecting therebeyond which support the ends of the package in a position over said elevator and devices on opposite sides of the path of movement of said elevator positioned to hold the end folds of the package in their folded positions and constructed and arranged to yield relatively to the packages to accommodate packages of different lengths.

9. In a machine of the character described, the combination with wrapping mechanism including means for folding a wrapper at the opposite ends of each wrapped article, and advancing means operative to carry the articles one at a time through said wrapping mechanism, of a banding mechanism to which packages are delivered by said advancing means and including a plunger movable at right angles to said advancing means to present packages to the operation of the banding devices, band feeding devices operative to position two bands side by side and parallel to each other in the path of movement of said plunger, and folding devices operative to fold said bands over the end folds of said package.

In testimony whereof I have signed my name to this specification.

HARRY Y. ARMSTRONG.

It is hereby certified that in Letters Patent No. 1,308,320, granted July 1, 1919, upon the application of Harry Y. Armstrong, of Springfield, Massachusetts, for an improvement in "Wrapping-Machines," errors appear in the printed specification requiring correction as follows: Page 6, line 111, for the reference-numeral "148" read *158;* same page, line 117, for the reference-numeral "158" read *156;* and that the said Letters Patent should be read with these corrections therein that the same may conform to the record of the case in the Patent Office.

Signed and sealed this 18th day of November, A. D., 1919.

[SEAL.]

M. H. COULSTON,

*Acting Commissioner of Patents.*

Cl. 93—2.